United States Patent
De Zaeytijd et al.

(10) Patent No.: US 10,289,400 B2
(45) Date of Patent: May 14, 2019

(54) OUTDATED RESOURCE HANDLING AND MULTIPLE-VERSION UPGRADE OF CLOUD SOFTWARE

(71) Applicant: AMPLIDATA N.V., Ghent (BE)

(72) Inventors: Ruben De Zaeytijd, Kluisbergen (BE); Carl Rene D'Halluin, Melle (BE); Frederik Jacqueline Luc De Schrijver, Wenduine (BE)

(73) Assignee: Amplidata N.V., Ghent (BE)

( * ) Notice: Subject to any disclaimer, the term of this patent is extended or adjusted under 35 U.S.C. 154(b) by 211 days.

(21) Appl. No.: 15/258,642

(22) Filed: Sep. 7, 2016

(65) Prior Publication Data

US 2018/0067736 A1   Mar. 8, 2018

(51) Int. Cl.
*G06F 8/65* (2018.01)
*G06F 9/50* (2006.01)
*H04L 29/08* (2006.01)

(52) U.S. Cl.
CPC .............. *G06F 8/65* (2013.01); *G06F 9/5072* (2013.01); *H04L 67/10* (2013.01); *H04L 67/34* (2013.01)

(58) Field of Classification Search
None
See application file for complete search history.

(56) References Cited

U.S. PATENT DOCUMENTS

| | | | |
|---|---|---|---|
| 7,080,371 B1 | 7/2006 | Arnaiz et al. | |
| 7,305,669 B2 | 12/2007 | Roush | |
| 7,360,208 B2 | 4/2008 | Joshi et al. | |
| 8,209,403 B2 | 6/2012 | Szabo et al. | |
| 8,434,077 B2 | 4/2013 | Chess et al. | |
| 8,479,056 B2 | 7/2013 | Andrews et al. | |
| 8,839,221 B2 | 9/2014 | Sapuntzakis et al. | |
| 8,881,136 B2 | 11/2014 | DeJana et al. | |
| 9,032,053 B2 | 5/2015 | Kosuru et al. | |
| 9,075,688 B2 | 7/2015 | Challa et al. | |
| 2003/0149970 A1 | 8/2003 | Shanbhogue et al. | |
| 2003/0233597 A1* | 12/2003 | Armstrong | G06F 11/2028 714/24 |
| 2008/0098037 A1* | 4/2008 | Neil | G06F 17/30297 |

(Continued)

FOREIGN PATENT DOCUMENTS

CN   102215480   10/2011

OTHER PUBLICATIONS

International Search Report and Written Opinion, PCT/IB2017/053500, dated Sep. 28, 2017 (16 pages).

(Continued)

*Primary Examiner* — Wei Y Zhen
*Assistant Examiner* — Binh K Luu
(74) *Attorney, Agent, or Firm* — Patent Law Works LLP

(57) ABSTRACT

A system and method for seamlessly and automatically handling outdated resources in a cloud and/or performing a multiple-version upgrade within the cloud with little visibility of interim operations to end users are presented. Mechanisms ensure that outdated resources do not communicate with the rest of the cloud (for example, via distributed data models and Application Programming Interfaces (APIs) before they are upgraded to a target software level. A multiple-version upgrade is implemented in the cloud by a single upgrade operation, by which internal paths for upgrading through various interim versions of software are concealed from end users of the cloud.

24 Claims, 12 Drawing Sheets

(56) References Cited

U.S. PATENT DOCUMENTS

| | | |
|---|---|---|
| 2009/0144720 A1 | 6/2009 | Roush et al. |
| 2011/0126168 A1 | 5/2011 | Ilyayev |
| 2012/0079471 A1* | 3/2012 | Vidal ................. G06F 8/65 717/169 |
| 2013/0055155 A1 | 2/2013 | Wong et al. |
| 2013/0332916 A1* | 12/2013 | Chinn ................ G06F 8/65 717/169 |
| 2014/0157251 A1* | 6/2014 | Hocker .............. G06F 8/71 717/170 |
| 2014/0201727 A1* | 7/2014 | Asselin ............. G06F 8/654 717/170 |
| 2014/0282469 A1 | 9/2014 | Johnson et al. |
| 2015/0020061 A1 | 1/2015 | Ravi |
| 2015/0134589 A1* | 5/2015 | Marrelli ........... G06F 17/30563 707/602 |
| 2017/0115978 A1* | 4/2017 | Modi ................. G06F 8/65 |
| 2018/0157547 A1* | 6/2018 | Smith ............... G06F 11/079 |

OTHER PUBLICATIONS

Platform Versioning <Retrived from https://developers.facebook.com/docs/apps/versions> Retrieved on Aug. 12, 2015, 8 pages.

Isilon OneFS Upgrade Planning and Process <Retrieved from http://www.emc.com/collateral/TechnicalDocument/docu50235.pdf> dated 2015 70 pages, EMC Corporation.

* cited by examiner

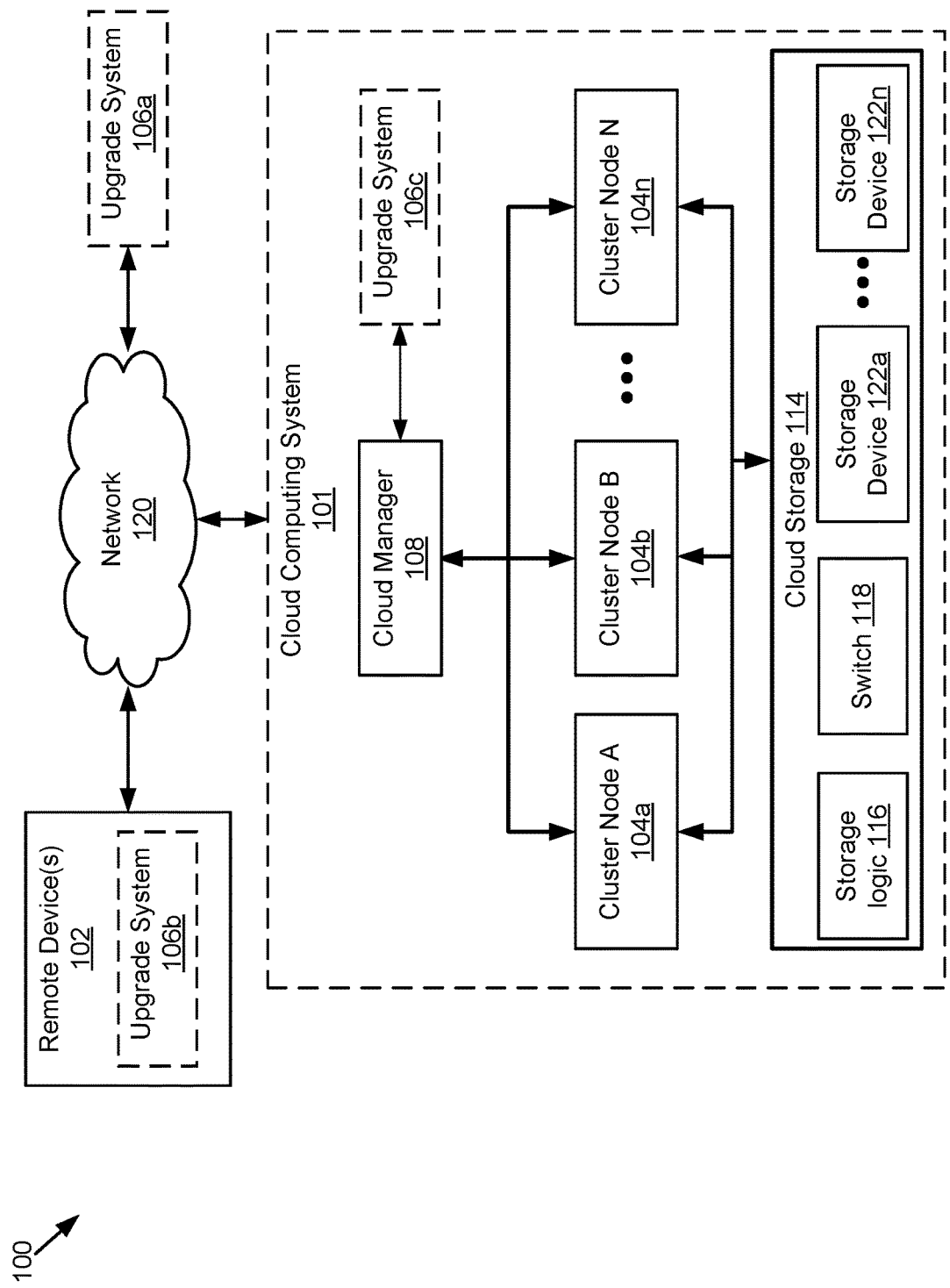

OUTDATED RESOURCE HANDLING AND MULTIPLE-VERSION UPGRADE OF CLOUD SOFTWARE

BACKGROUND

The present disclosure relates to handling outdated resources and performing a seamless multiple-version upgrade of cloud software in cloud architecture or other distributed environments. In particular, the present disclosure relates to identifying and preventing communications by an "outdated resource" (i.e., a resource that is not at the desired target version), removing the outdated resource, and executing a multiple-version upgrade of the outdated resource to the desired target version (visible to an end user of the cloud as a single upgrade operation, yet with one or more interim upgrade paths that are concealed from the end user).

Cloud computing and architecture have become increasingly popular for offering various Information Technology (IT) concepts as services. In one implementation, consumers or requesters can request a service they desire and transact with a "cloud" provider for the needed service. Cloud computing and architecture are used in many applications, including educational institutions, healthcare, retail, travel, etc., to name just a few.

Cloud software used in such cloud architecture tends to evolve at a rapid pace, requiring frequent upgrades. In many instances, cloud upgrades are necessary to add new features or to fix security vulnerabilities that surface. These critical services are driving the demand for continuous improvements in cloud availability. Yet, cloud unavailability must be avoided to prevent disruption to consumers of the services operated by the cloud.

In some instances, cloud service providers routinely provide software upgrades while sustaining service, a procedure called online software upgrade. Industry best practices for software upgrades recommend avoiding downtime through rolling upgrades, which upgrade and then reboot each host in a wave rolling through the data center. Some cloud service providers may establish sections or domains and then upgrade one section or domain at a time. This allows shutting down and restarting the resources in each section or domain. Such rolling upgrades avoid service interruptions and impose very little capacity loss, but are feasible only with maintaining backward compatibility, so the system's clients can interact with either the outdated version or the target version of the software during a rolling upgrade, which requires the two versions to interact with each other in a compatible manner. Current commercial tools that facilitate rolling upgrades provide no way for determining if interactions between the mixed versions are safe and secure. Even more significantly, in most instances, system behavior with mixed versions of software is not guaranteed to conform to the specification of either version and is hard to test and validate in advance.

Moreover, cloud computing and architecture has introduced new paradigms that are not well integrated into the existing approaches for software maintenance and evolution. For example, the ability to adjust the computer and storage resources elastically, which is one of the most distinctive features provided by the cloud, in not fully utilized by the current upgrade mechanisms. Software upgrades in this environment can result in challenges for both developers and quality assurance engineers.

The present disclosure solves problems associated with handling outdated resources and upgrading multiple versions of software in cloud architecture, by providing an effective system for preventing communications by outdated resources and implementing multiple-version upgrade schemes seamlessly in a single operation, with internal operations of interim upgrades concealed from end users of the cloud.

SUMMARY

The present disclosure relates to systems and methods for seamlessly and automatically handling outdated resources in cloud architecture and performing multiple-version upgrades within the "cloud" that appear to end users as a single upgrade. The systems and methods of the disclosed technologies are for safeguarding heterogeneous software versions on the cloud. The systems and methods are configured with mechanisms to ensure that outdated resources (i.e., resources that are not at the desired target version) do not communicate with the rest of the cloud (for example, via distributed data models and Application Programming Interfaces (APIs) before they are upgraded to the desired target software level. The systems and methods are configured to implement the multiple-version upgrades in the cloud in a single upgrade run, by which the internal paths for performing the upgrades, including operations and details, are not transparent to end users of the cloud.

To implement multiple-version upgrades, upgrade paths may be serialized internally, which are invisible to the customer. Advantageously, upgrade path testing and component compatibility matrices are reduced to a few well-known and fully-tested upgrade paths. In some implementations, this innovative aspect may be implemented by systems and methods that are separate and apart from those configured for handling of outdated resources.

In some embodiments, handling of outdated resources may be implemented separately from multiple-version upgrades. Advantageously, these mechanisms lend great value, since any system may be configured to self-protect from components that run on outdated (incompatible) software versions, so that they do not communicate with the rest of the cloud. This innovative aspect may be combined with the multiple-version upgrade mechanisms to bring an outdated resource back on track, yet it may be implemented alone.

According to one innovative aspect of the subject matter in this disclosure, the method includes receiving, by a controller, a request to execute an upgrade of at least one resource at a particular cluster node in a cloud, the upgrade for converting the resource from an initial version to a final version; responsive to receiving the request, determining, by the controller, if the resource is in an outdated state; flagging, by the controller, the resource if it is determined to be in the outdated state; executing an instruction, by the controller, to prevent communication from the outdated resource to other cluster nodes in the cloud; determining, by the controller, if a multiple-version upgrade is required to update the outdated resource, from the initial version to the final version, and determining one or more paths required to upgrade to the final version, including determining if one or more intermediate paths are required for the conversion; executing the multiple-version upgrade, by the controller, by first converting the initial version of the resource to the one or more interim versions, via the one or more interim paths, and subsequently converting from the interim versions to the final version; and concealing from the end user conversions through the interim versions to the final version.

Other implementations of one or more of these aspects include corresponding systems, apparatus, and computer programs, configured to perform the actions of the methods, encoded on computer storage devices. These and other implementations may optionally include any one of the following features.

For instance, the method may include accessing, by the controller coupled to a central location, data provided by the cluster node to indicate states of multiple resources at the cluster node, wherein the cluster node provides the data indicating the states to the central location.

For instance, the method may include executing the multiple-version upgrade upon determining an outdated state for a particular resource from the central location.

For instance, the method may include determining the outdated state for a particular resource from the central location at predetermined times.

For instance, the method may include tracking the number of interim versions and associated paths and placing them in queue for conversion.

For instance, the method may include accessing the cluster node by the controller to determine if a particular resource at the cluster node is outdated.

For instance, the method may include shutting down operations by a mechanism at the cluster node, in the event the controller cannot reach or communicate with the cluster node. Additionally, the method may include shutting down operations by a mechanism at the cluster node, in the event the controller can communicate with the cluster node, but determines that it is outdated.

For instance, the method may include an indication of the outdated state of a resource in the cluster node, to show if it is either improperly upgraded or not upgraded.

For instance, the method may include determining, responsive to the request to upgrade, one or more required paths for a target upgrade version and splitting metadata for the target upgrade version into a plurality of previously defined and tested version paths from a matrix.

It should be understood that language used in the present disclosure has been principally selected for readability and instructional purposes and not to limit the scope of the subject matter disclosed herein.

BRIEF DESCRIPTION OF THE DRAWINGS

The present disclosure is illustrated by way of example, and not by way of limitation, in the figures of the accompanying drawings in which like reference numerals are used to refer to similar elements.

FIG. 1 is a high-level block diagram illustrating example cloud architecture and environment with an upgrade system in accordance with one embodiment of a system implementing the invention.

DETAILED DESCRIPTION

Figure 2A:
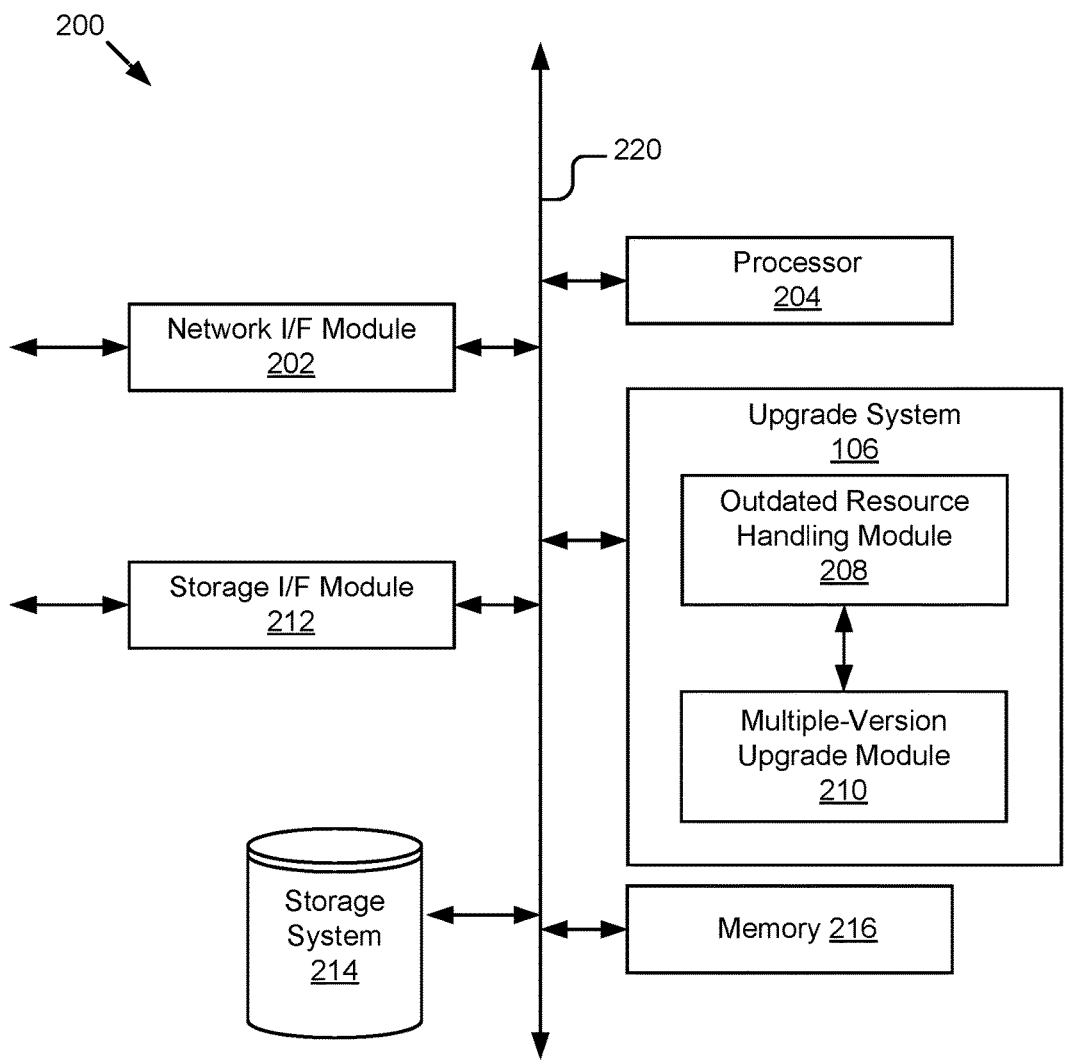
FIG. 2A is a block diagram illustrating an example hardware configuration of an upgrade system in accordance with one embodiment of a system implementing the invention.

System and method architecture for executing a multiple-version upgrade and handling outdated resources in a cloud or cloud computing system are described below. Although the systems and methods of the present disclosure are described in the context of particular system architectures that are illustrated, it should be understood that the systems and methods may be applied to other architectures and organizations of hardware with similar properties.

The present disclosure addresses the problem of upgrading software in a cloud environment. With the advent of cloud computing, different types of clusters to form a cloud have evolved. These include high-availability clusters, high-performance clusters, load-balanced clusters, and the like. Software upgrades in these types of clusters are complex. These types of clusters include multiple nodes that interact with each other to provide users with various applications and system resources as a single entity.

In large-scale cloud software, it is desirable to have a well-defined set of upgrade paths (e.g., combinations of "from" software versions and "to" software versions) defined in a matrix. By this, each of the supported paths can be tested correctly. The smaller the matrix, the easier it is to test the upgrade paths and quickly accomplish the upgrade. Customers of the cloud may want to upgrade from their currently-installed version directly to another version (e.g., a more-recent version or the latest version, referred to herein as a "target version" or "final version"), with little operator intervention to run the upgrade and minimum cloud downtime. For example, if a particular customer is on software version A of a particular software and a company releases software version X, the customer often desires a direct upgrade from software version A to software version X, with an upgrade experience that is seamless.

The system, upon performing a rolling upgrade, may detect that a node cannot be upgraded correctly and flags the node to an "outdated" state in a central location or model. When the node is reached, the upgrade shuts down the software services performed on that node to prevent outdated software from communicating with the updated cloud. In yet another innovative aspect, when a rolling upgrade detects a node cannot be upgraded correctly, it flags the node to an "outdated" state in the central location. When the node is reachable, the upgrade shuts down the software services on that node to prevent outdated software communicating with the updated cloud. When the node is unreachable, the node is configured to itself shut down its software services when it detects that it has been put in an "outdated" status in the central location or when it cannot reach the central model (distributed) anymore (e.g., in case of a network split). In this instance, the resource checks the central model before starting up its services. In case it is "outdated" or unreachable, it does not start up its services. When services are running, it shuts them down. This check is conducted every N seconds (a predetermined period). In the event a node is unreachable, the rolling upgrade process will wait for N+X seconds (where X is a buffer period). After waiting that amount of time, the system assumes that the node has shut down its outdated services and continues to upgrade the other resources.

A multiple-version upgrade method is configured for supporting upgrade paths that internally consist of one or more upgrade paths, without exposing these details to the end user of the cloud. It enables an upgrade path from version X of the software to version Z of the software to be performed in a single upgrade run, while allowing the upgrade internally to go over a possible version Y. The upgrade metadata is configured to divide an upgrade path into well-known, well-defined, and well-tested upgrade paths. For example, a customer can initiate the upgrade from X to Z, while the software internally first converts to version Y. The upgrade follows the well-tested X→Y upgrade path. The system keeps track of all versions of resources currently installed. If all resources are on version Y or flagged as outdated, it internally schedules the Y→Z upgrade path. The system ensures that multiple versions of cloud software may be automatically and seamlessly upgraded. In some instances, there are methods of safeguarding heterogeneous software versions on the cloud. The upgrading supports an upgrade path from a particular version X of the software to another version Z of the software in a single upgrade run (while allowing the upgrade internally to go over a possible version Y) to limit the upgrade version support matrix and testing to smaller paths (for example, from version X to version Y and from version Y to version Z).

FIG. 1 is a high-level block diagram illustrating an example environment in which the invention may operate (for example, a cloud computing system wherein a system 106 is configured for upgrading distributed applications, referred to herein as the upgrade system). It should be recognized that FIG. 1 as well as the other figures are used to illustrate an embodiment, and an indication of a letter after a reference number or numeral (for example, "106a") is a specific reference to the element or component that is designated by that particular reference numeral. In the event a reference numeral appears in the text without a letter following it (for example, "106"), it should be recognized that such is a general reference to different embodiments of the element or component bearing that general reference numeral.

This upgrade system 106 is configured to serve as an "interim" system to handle all outdated resources in the cloud architecture and to perform multiple-version upgrades that appear to the end user as a single upgrade operation, yet define internal paths that are configured to follow one or more paths that are not visible to the end user. It should be noted that not all the components illustrated may be required to practice the invention, and variations in the arrangement and type of the components may be made without departing from the spirit or scope of the invention.

As shown in FIG. 1, the cloud environment 100 represents an example cloud architecture in which the upgrade system 106 serves as an "interim" platform adapted to perform multiple-version upgrades and update outdated resources, while keeping high availability and access to the cloud services. The cloud environment 100 illustrates remote devices 102 coupled through a network 120 to a cloud computing system 101 including a cloud manager 108 for managing cloud services to, from, and within the server clusters within the cloud and interfaces with other devices and systems coupled to the server clusters.

Before describing the innovations in detail in the context of FIG. 1 and the other figures illustrated, some terms are defined. It should be understood that a "cluster" refers to a collection of computer systems, redundant resources distributed among computer systems, or "cluster nodes" that are managed as a single entity, and either providing services that reside on a single entity, or providing services that may reside on a single cluster node and configured to be moved among the cluster nodes. A "cluster" may improve the availability of the services that it provides, by providing redundancy or moving services among the nodes to handle failures. The term "cluster node" or "node" refers to a computing element that is one logical part of a cluster. A "node" refers to a platform that hosts cluster software and applications. The platform may be a physical machine or a virtual machine. In one embodiment, a node platform may include a physical device, such as a computer, or the like, and an operating system. A "cluster" may refer to a collection of such nodes. A node as illustrated may also be a virtual operating environment running on a physical device (i.e., a virtual node), and a cluster may refer to a collection of such virtual nodes. One or more software components enabled to execute on a physical device may be considered to be a node. A node may be a virtual machine or a physical machine. In one embodiment, a node may be connected to other nodes within a network. The term "node" refers to a cluster of physical or virtual nodes. Two or more clusters may be collected on the same set of physical nodes. In such a configuration, each cluster may be referred to as separate virtual clusters, or they may be referred to as separate virtual clusters, or they may be referred to as two clusters that share hardware platforms.

As used here, a cluster "resource" may refer to any service, component or class of components that may be provided on multiple cluster nodes. Resources may include instructions or data. Examples of resources include disk volumes, network addresses, software processes, file systems, databases, or the like. The term "resource group" refers to any group or collection of resources that run together on the same node. An "instance" of a resource may include one or more executing threads or processes, data, an address, or a logical representation of a component.

The resources may be configured to be dependent on one another, in a "dependency relationship," by which any one resource acts in a particular manner based on the state of another resource. To that end, a resource that is dependent on the state of another resource may be referred to as a "dependent resource" or simply "dependent." A "dependee resource" or simply "dependee" defines a resource upon which a dependent resource depends. Dependency relationships are generally directed and acyclic. In other words, the relationships between resources might form a directed acyclic graph (i.e., there are no cycles, and the relationships are one-way). A "dependee resource" may have one, two, or more corresponding dependent resources, and a dependent resource may have one, two, or more corresponding dependee resources. Any reference to a "partition" of a cluster of nodes refers to a non-empty proper subset of the nodes. Reference to a first partition and a second partition refers to two non-overlapping partitions in a cloud infrastructure.

The system 100 includes the remote devices 102, which may be client devices configured to access the cloud architecture, to either participate in or use the cloud services. The network 120 represents connections by which the remote devices 102 connect to the cloud computing system or cloud 101. The cloud 101 as illustrated includes multiple cluster nodes, for example, cluster node A (104a), cluster node B (104b), through cluster node N (104n). Each cluster node A, B, or N, as represented, may run a local operating system kernel and a portion of a cluster framework. A cluster may be a number of computers that have some features in common. This may include providing redundant services or a common API (Application Program Interface), or including common software, such as operating system software or application software. For instance, a database cluster may implement a database. A cluster in the cloud 101 has multiple node computers that may be in communication with each other or with a network device. Each of the represented nodes includes an operating system (OS), cluster extensions, and various application software. The number of nodes, the interconnections, and the network structure may vary.

The system 100 as illustrated includes the upgrade system 106, which is illustrated in several implementations. In one embodiment, the upgrade system 106 may be a separate unit 106a coupled through the network 120. In another embodiment, the upgrade system 106 may be configured within a remote device 102 (as 106b), either in part, or entirely. In yet another embodiment, the upgrade system 106 may be located in the cloud 101 and configured to operate either alone or in conjunction with the cloud manager 108 (as 106c), depending upon how and where the components and functionalities of the present invention are distributed. It should be recognized that in the cloud 101, any one or more of the OS, OS cluster extensions, or application software may require upgrading or may be replaced from time to time. The present innovations solve existing problems associated with outdated resources and upgrading multiple versions of software in cloud architecture to ensure smooth operations of the cloud services.

In some implementations, distributed systems in a cloud 101 may have multiple copies of an application executable code executing in separate processes. In some implementations, the various instances of an application in the cloud 101 may operate on different hardware platforms. In some instances, a load-balancing system in the cloud 101 may distribute the workload across each instance of the application. In some implementations, distributed applications in the cloud are used in situations with a high degree of scalability (for example, a website or web application may be scaled to include multiple processes for larger traffic flows). This requires duplication of a distributed application (software) into many hundreds or thousands of instances, each operating in parallel. In such scenarios, a distributed application in the cloud 101 may be updated, by using information provided by the application to determine grouping, sequencing of update versions, and whether to advance an update sequence. In some scenarios, updating mechanisms may require repair before updating and may change the topology of the distributed application, as well as make changes to the application executable code, application configurations, operating system (OS), virtual machines, and host machines, among others. In some scenarios, a distributed application in the cloud may use a quorum server to determine which version of software is the target version, and the quorum may change during the updating process.

In some implementations of the cloud 101, the updating mechanisms may allow the distributed application to be highly available during the update process. The updates may be performed on groups of replicas of the application, such that when one group is being updated, other groups may remain operational. The groups may be defined as domains (see FIGS. 3A, 3B, and 3C), within which a particular set of application processes may be updated. In instances when an update is not successful within the update domain, the update may be suspended or reversed to the previous version. The update mechanisms may allow updates to be performed on the application itself, which may include changing the application configuration, as well as updating the application executable code. The update mechanisms may perform updates on a host device, a virtual machine, or a guest operating system within the virtual machine, as well as updating the topology of the application replicas.

These cluster nodes A, B, through N as illustrated in FIG. 1 are coupled to the cloud manager 108. In some instances, the cloud manager 108 is configured to manage the different networks 120 (network 120 represents either one or a plurality of networks) potentially distributed across the world. Each of the networks 120 is configured to provide content services for one or more tenants (e.g., clients or customers) via the remote devices 102. The networks 120 may be hosted within a cloud service and/or in an on-premises data center. The cloud manager 108 may be used in deploying, configuring and managing networks 120. The cloud manager 108 may be configured to receive requests through an idempotent and asynchronous application web service application programming interface (API) that can tolerate intermittent network failures. In some scenarios, the cloud manager 108 may serve as the administrator of the update process to apply changes to the cloud services architecture, and the same update process may be used by an application owner to perform updates on the application. In some cloud computing environments, a cloud service provider may manage the underlying hardware and provide some software services (such as an operating system) to the application. In such implementations, the cloud service provider may periodically update the host hardware and software, as well as software executing on various virtual machines on which the application may execute. For example, an application may execute on a guest operating system in a virtual machine. The application or administrator may configure the cloud service provider for the guest operating system to implement all security updates as the updates are available.

The network 120 may be one of a conventional type, wired or wireless, and may have numerous different configurations including a star configuration, token ring configuration, or other configurations. Furthermore, the network may include a local area network (LAN), a wide area network (WAN) (e.g., the Internet), and/or other interconnected data paths across which multiple devices may communicate. In some implementations, the network may be a peer-to-peer network. The network may also be coupled with or include portions of a telecommunications network for sending data using a variety of different communication protocols. In some implementations, the network may include Bluetooth (or Bluetooth low energy) communication networks or a cellular communications network for sending and receiving data including via short messaging service (SMS), multimedia messaging service (MMS), hypertext transfer protocol (HTTP), direct data connection, Wireless Application Protocol (WAP), email, etc.

In the depicted embodiment, the cloud computing system 101 may include cloud storage 114, including storage logic 116, a switch 118, and one or more storage devices 122a through 122n. In the illustrated embodiment, the storage logic 116 and the one or more storage devices 122a through 122n are communicatively coupled via switch 118. However, the present disclosure is not limited to this configuration, and a variety of different system environments and configurations can be employed and are within the scope of the present disclosure. Other embodiments may include additional or fewer components.

In some embodiments, the cluster nodes A, B, through N are coupled to a cloud storage 114, including storage logic 116, a switch 118, and multiple storage devices 122a through 122n. The storage logic 116 provides cross-device redundancy schemes. The storage logic 116 can provide computing functionalities, services, and/or resources to send, receive, read, write, and transform data from other entities of the system 100. In some embodiments, the storage logic 116 can be a computing device configured to make a portion or all of the storage space available on storage devices 122. The storage logic 116 is coupled to the switch 118 for communication and cooperation with the storage devices 122a-122n of the system 100. In other embodiments, the storage logic 116 transmits data between the storage devices 122 via the switch 118. It should be recognized that multiple storage logic units 116 may be utilized, either in a distributed architecture or otherwise. For the purpose of this application, the system configuration and operations performed by the system are described in the context of a single storage logic 116.

The switch 118 may be a conventional type, wired, and may have numerous different configurations. Furthermore, the switch 118 may include an Ethernet, InfiniBand, Peripheral Component Interconnect Express (PCI-Express) switch, and/or other interconnected data path switches, across which multiple devices (e.g., storage devices 122) may communicate. Although the example of FIG. 1 illustrates a single switch 118, in practice one or a plurality of switches 118 can connect the entities of the cloud computing system 101.

The storage devices 122a through 122n may include a non-transitory computer-usable (e.g., readable, writeable, etc.) medium, which may be any non-transitory apparatus or device that can contain, store, communicate, propagate or transport instructions, data, computer programs, software, code routines, etc., for processing by or in connection with a processor. In some embodiments, the storage devices 122a through 122n communicate and cooperate with the storage logic 116 by switch 118. The storage devices 122 may be flash memory or may include a volatile memory such as a dynamic random access memory (DRAM) device, a static random access memory (SRAM) device, or some other memory devices.

FIG. 2A is a block diagram illustrating an example upgrade system, referenced generally by reference numeral 200, in accordance with one embodiment of a system implementing the invention. The example upgrade system 200 may include a network interface (I/F) module 202, a processor 204, a storage system 214, an upgrade system 106 (with an outdated-resource-handling module 208 and a multiple-version upgrade module 210), and a memory 216.

The components of the system 200 are communicatively coupled to a bus or software communication mechanism 220 for communication with each other.

In some implementations, software communication mechanism 220 may be an object bus (e.g., Common Object Request Broker Architecture (CORBA)), direct socket communication (e.g., Transmission Control Protocol (TCP)/Internet Protocol (IP) sockets) among software modules, remote procedure calls, User Datagram Protocol (UDP) broadcasts and receipts, HTTP connections, function or procedure calls, etc. Further, any or all of the communication could be secure (Secure Shell (SSH), Hypertext Transfer Protocol Secure (HTTPS), etc.). The software communication mechanism 220 can be implemented on any underlying hardware (for example, a network, the Internet, a bus, a combination thereof, etc.).

The network interface (I/F) module 202 is configured to connect system 200 to a network and/or other system, for example network 120 (FIG. 1). For example, network interface module 202 may enable communication through one or more of the Internet, cable networks, and other wired networks (as represented by network 120 in FIG. 1). The network interface module 202 links the processor 204 to a network (e.g., 120 in FIG. 1) that may in turn be coupled to other processing systems (e.g., a client or remote device 102 in FIG. 1). The network interface module 202 also provides other conventional connections to the network 120 for distribution and/or retrieval of files and/or media objects using standard network protocols such as TCP/IP, HTTP, HTTPS and Simple Mail Transfer Protocol (SMTP) as will be understood. In some implementations, the network interface module 202 includes a transceiver for sending and receiving signals using Wi-Fi, Bluetooth®, or cellular communications for wireless communication.

The network interface module 202 may allow client and/or server devices to store data to and retrieve data from the storage system 214 (for example, across the network 120 (FIG. 1)). For example, the network interface module 202 may allow one or more components of the system 200 to act as network accessed storage or as an array of storage devices.

The processor 204 may include an arithmetic logic unit, a microprocessor, a general-purpose controller or some other processor array configured to perform computations and provide electronic display signals to a display device in accordance with the present invention. In some implementations, the processor 204 is a hardware processor having one or more processing cores. The processor 204 is coupled to the bus 220 for communication with the other components of system 200. Processor 204 processes data signals and may include various computing architectures including a complex instruction set computer (CISC) architecture, a reduced instruction set computer (RISC) architecture, or an architecture implementing a combination of instruction sets. Although only a single processor is shown in the example of FIG. 2A, multiple processors and/or processing cores may be included. It should be understood that other processor configurations are possible.

The storage system 214 is a data storage system that may store information on any type of attached array of writable storage media, such as magnetic disk or tape, optical disk (e.g., CD-ROM or DVD), flash memory, solid-state drive (SSD), electronic random access memory (RAM), microelectro mechanical and/or any other similar media adapted to store information, including data and parity information. However, as illustratively described herein, the information is stored on disks of hard disk drives (HDDs). The storage device(s) of the storage system 214 may be included in one or more enclosures housed in the same location or physically distributed to disparate locations across a storage area network.

The memory 216 stores instructions and/or data that may be executed by the processor 204. The memory 216 is coupled to the bus 220 for communication with the other components of the system 200. The instructions and/or data stored in the memory 216 may include code for performing any and/or all of the techniques described herein. The memory 216 may be, for example, volatile memory such as a dynamic random access memory (DRAM) device, a static random access memory (SRAM) device, or some other volatile memory device. In some implementations, the memory 216 also includes a non-volatile memory or similar permanent storage device and media, for example, a hard disk drive, a floppy disk drive, a compact disc read only memory (CD-ROM) device, a digital versatile disc read only memory (DVD-ROM) device, a digital versatile disc random access memory (DVD-RAM) device, a digital versatile disc rewritable (DVD-RW) device, a flash memory device, or some other non-volatile storage device. In some implementations, the memory 216 may store the outdated-resource-handling module 208 and the multiple-version upgrade module 210 and executable code to perform their functionalities.

Figure 2B:
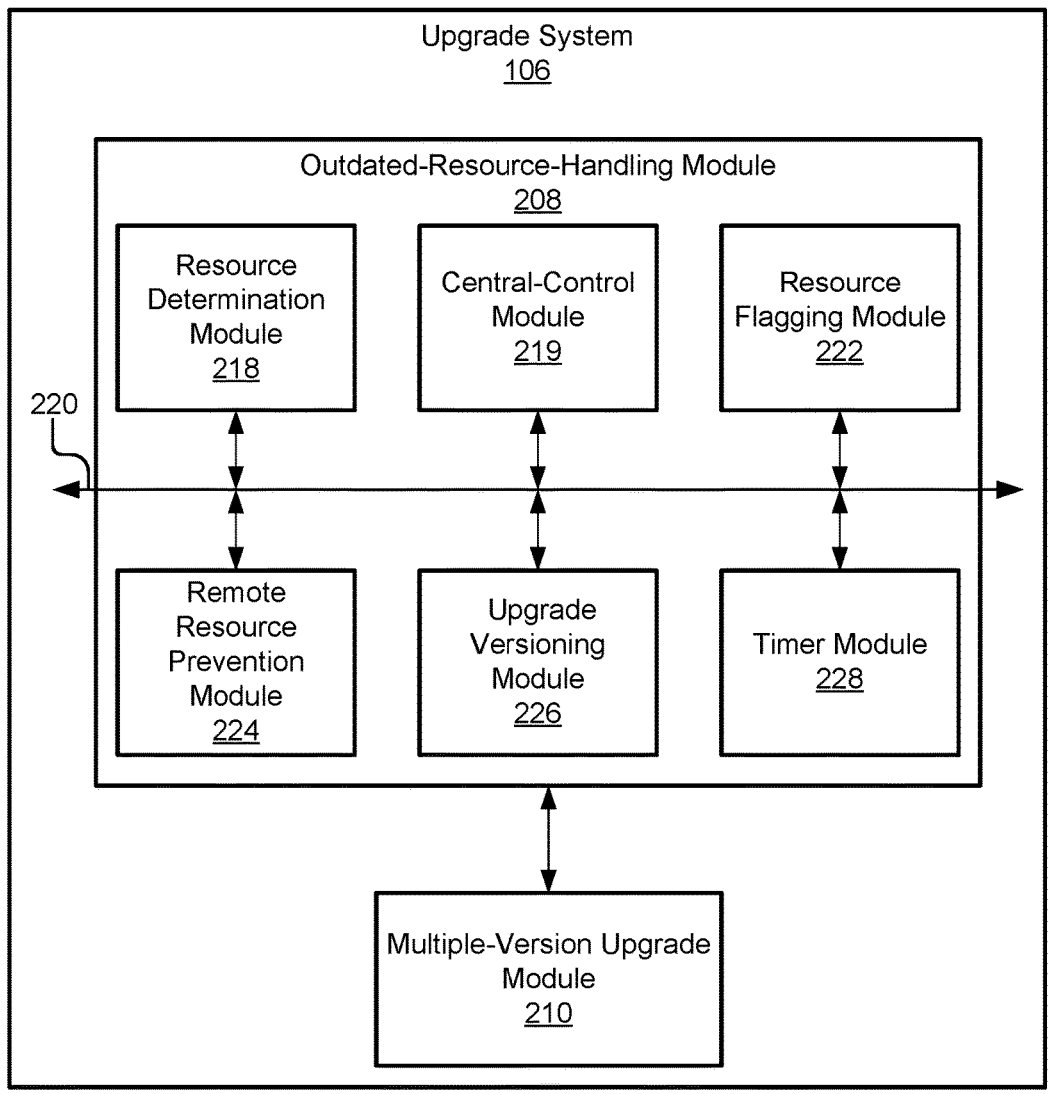
FIG. 2B is a block diagram illustrating an example hardware and software configuration of an example outdated-resource-handling module in the upgrade system in accordance with one embodiment of a system implementing the invention. The outdated-resource-handling module is configured to effect shutdown of a resource within a node, upon access to the node by a management tool from a remote location providing instructions for shutdown.

Referring now to FIG. 2B, in one embodiment, as illustrated, the outdated-resource-handling module 208 includes a resource-determination module 218, a central-control module 219, a resource-flagging module 222, a remote-resource-prevention module 224, an upgrade-versioning module 226, and a timer module 228. However, it should be recognized that, as described below, each of these modules described extends the functionality of the API of the upgrade system 106. Therefore, in some implementations, each of these modules may (depending on the implementation) either omit or add functionality.

In some implementations, the resource-determination module 218 determines outdated resources in the cloud architecture (for example, at each of the cluster nodes A through N). In some implementations, the central-control module 219 may access each of the nodes A through N in designated patterns to scan them to determine the status of the resources. During upgrades of the cloud software, the central-control module 219 is configured to ensure that any outdated resources do not communicate with the rest of the cloud clusters and services (e.g., distributed data models and APIs) before they are upgraded to a target software level. The outdated-resource-handling module 208 includes a resource-flagging module 222 for designating the outdated versions of software. In some implementations, during a rolling upgrade of the cluster nodes A through N, when the central-control module 219 determines that a node cannot be upgraded correctly, the resource-flagging module flags the particular node to an OUTDATED state in the central-control module 219.

In some implementations, the outdated-resource-handling module 208 includes a remote-resource-prevention module 224. The remote-resource-prevention module 224 (in conjunction with the central-control module 219), upon reaching a cluster node (any of node A through N) when it is reachable, shuts down the software services on that cluster node to prevent outdated software from communicating with parts of the cloud that are updated. When the software services on that cluster node are prevented from communicating with other parts of the cloud, the upgrade-versioning module 226 updates the resource or software at that particular node to the target version. In some implementations, the central-control module 219 may perform periodic checks of the cluster nodes according to period times either designated or monitored by the timer module 228.

In some implementations, the outdated-resource-handling module 208 includes an upgrade-versioning module 226, and the storage system 214 (FIG. 2A) stores a target version of a resource.

Figure 2C:
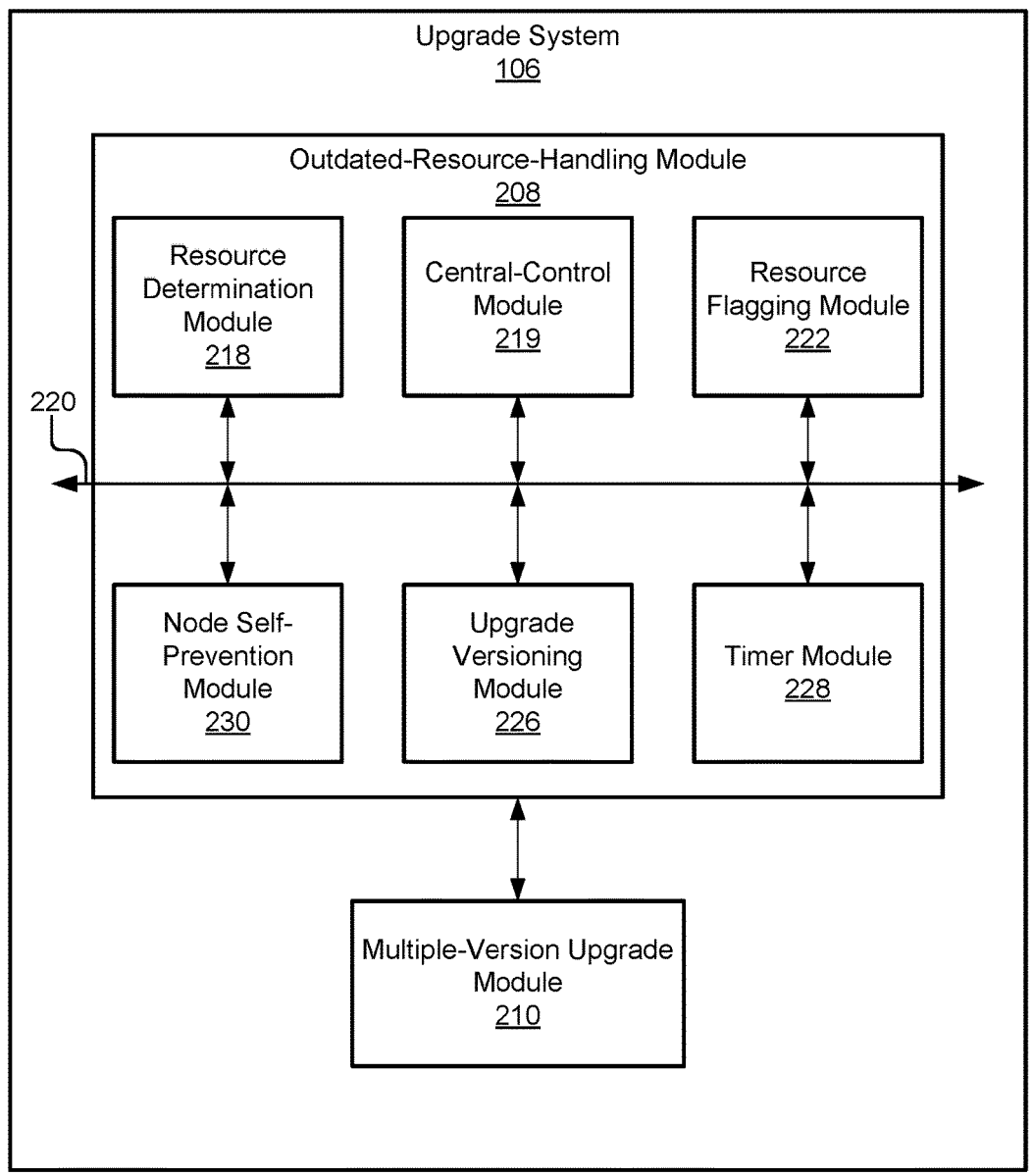
FIG. 2C is a block diagram illustrating an example hardware and software configuration of an example outdated-resource-handling module in the upgrade system in accordance with another embodiment of a system implementing the invention. The outdated-resource-handling module includes a mechanism at a node itself that is configured to effect shutdown of a resource within the node, when the node is not accessible to a management tool from a remote location.

Referring now to FIG. 2C, in another embodiment and scenario where the upgrade system 106 cannot reach a cluster node (any of Node A through N) during a rolling upgrade, as illustrated, the outdated-resource-handling module 208 includes a resource-determination module 218, a central-control module 219, a resource-flagging module 222, a node-self-prevention module 230, an upgrade-versioning module 226, and a timer module 228. However, it should be recognized that, as described below, each of these modules described extends the functionality of the API of the upgrade system 106. Therefore, in some implementations, each of these modules may (depending on the implementation) either omit or add functionality. The resource-determination module 218, the central-control module 219, the resource-flagging module 222, the upgrade-versioning module 226, and the timer module 228 in FIG. 2C are similar to their respective counterparts in FIG. 2B.

In some implementations, the outdated-resource-handling module 208 includes the node-self-prevention module 230. The node-self-prevention module 230 (when the node is not reached by a central-control module 219 in a distributed environment) is configured by itself to shut down the software services on that cluster node to prevent outdated software from communicating with parts of the cloud that are updated. The node-self-prevention module 230 performs the shut down when it detects that the cluster node is placed in an OUTDATED status in the central-control module 219 or when it cannot reach the central-control module 219 in the event of a network split. In this instance, the node-self-prevention module 230 is configured to check the central-control module 219 to determine its state or status before starting. If not OUTDATED, the node-self-prevention module 230 is configured to start. If OUTDATED, the node-self-prevention module 230 is configured to not start its services. If the services at that node are running, the node-self-prevention module 230 is configured to shut them down. This check may be conducted periodically as determined by the timer module 228. In some instances, it may be every N seconds. The rolling upgrade process, in the event a particular node is unreachable, is adapted to wait for N+X seconds, where X serves as a buffer period. After waiting that amount of time, the node-self-prevention module 230 is configured to assume that the node has shut down its outdated services, and the upgrade-versioning module 226 is configured to continue to upgrade the other resources at the other nodes.

Figure 2D:
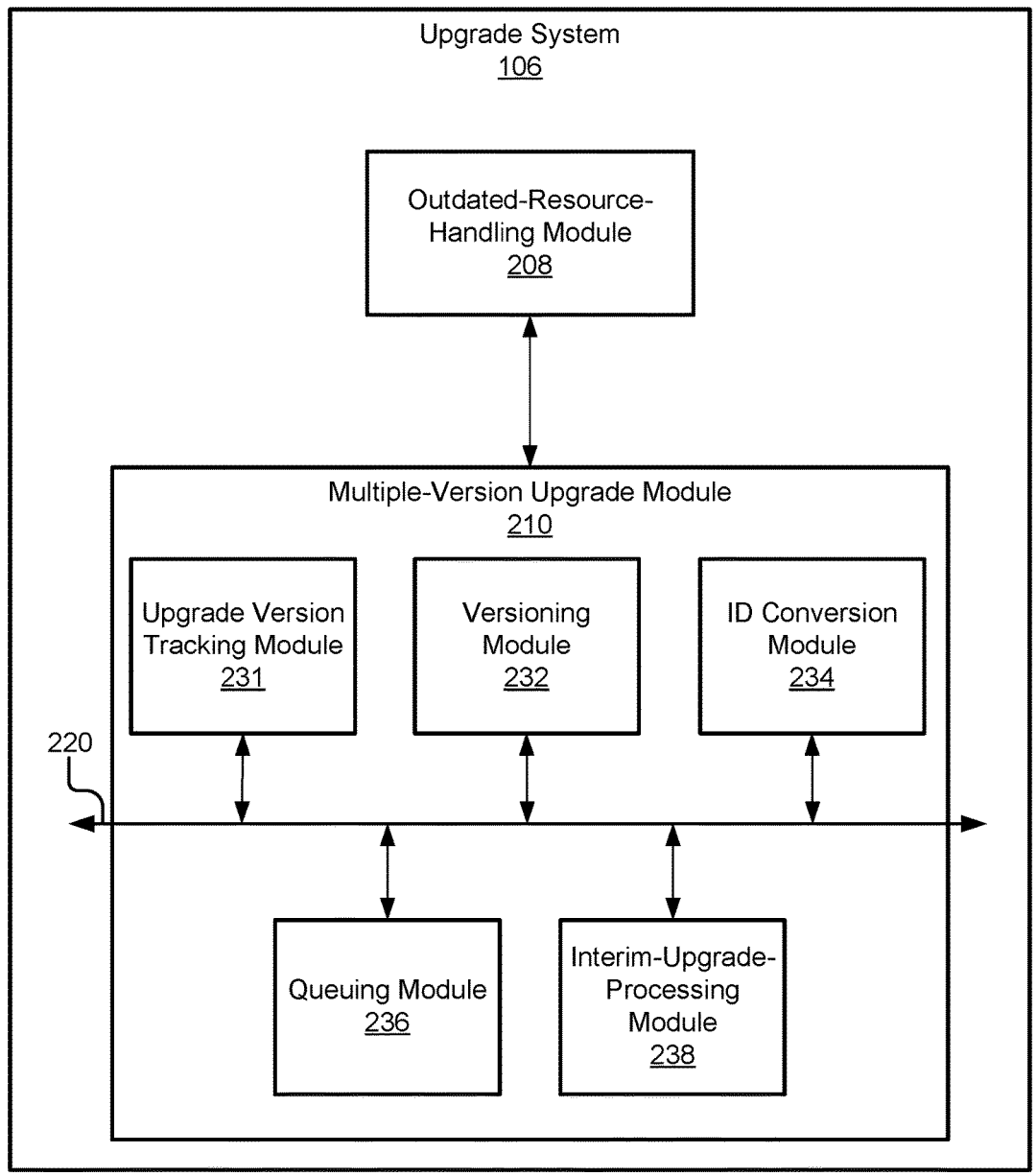
FIG. 2D is a block diagram illustrating an example hardware and software configuration of a multiple-version upgrade module in the upgrade system.

Referring now to FIG. 2D, the multiple-version upgrade module 210 includes an upgrade-version-tracking module 231, a versioning module 232, an ID-conversion module 234, a queuing module 236, and an interim-upgrade-processing module 238. The multiple-version upgrade module 210 supports upgrade paths that internally may consist of one or more paths (interim paths that correspond to previously defined or tested paths), without exposing these details to the end user of the cloud (e.g. a client on the remote device 102 in FIG. 1).

The upgrade-version-tracking module 231 determines the currently-installed version of the resource or software (e.g., versions X, Y, or Z). By way of example, the upgradeversion-tracking module 231 may determine that the currently-installed version at cluster node A (FIG. 1) is version X.

The versioning module 232 supports an upgrade path from the currently-installed version (e.g., version X in this instance) of the resource software to target version Z of the software in what appears to be a single upgrade run to the consumer, while allowing the upgrade process internally to go over a Y conversion.

The ID-conversion module 234 is configured to use the upgrade metadata of a particular resource version and to split up or segment an upgrade path into multiple well-known, well-defined, and well-tested upgrade paths, by identifying each of them (e.g., version Y metadata may be split into Y1-YN), designating them (e.g., in a matrix or like configuration) for the rolling upgrade process. This technique allows for generic content upgrade release, for example, containing metadata. For example, for version X, the well-defined path may include multiple packages, configurations, and scripts that are specific for version X that may be formulated into a matrix configuration. For version Y, the well-defined path may include multiple packages, configuration and scripts specific for version Y. For version Z, the well-defined path may include multiple packages, configuration, and scripts for version Z.

The queuing module 236 queues the sequence of these paths in the required order for each version. In some implementations, small matrix configurations defining the well-defined paths are provided and used by the queuing module 236. As an example, consider a scenario in which only a version upgrade from version X to version Y and from version Y to version Z were tested by quality engineering of an entity providing technical support for its system, and a particular customer is operating version X, yet desires a conversion from version X to the target version Z. Between versions X and Z, there may be incompatible changes or API changes that may require going over version Y first. Customers may not want to either address each interim upgrade (e.g., version Y) or ensure that the upgrade is proper and in effect until the end of the process (e.g., an upgrade from version X, to version Y, and then version Z).

The interim-upgrade-processing module 238 executes interim upgrades. In some implementations, from the customer's perspective, a customer may initiate an upgrade from version X to version Z, while the upgrade process internally first automatically converts to version Y (following the paths defined by the metadata and executed by the interim-upgrade-processing module 238) and then to version Z. It will follow the well-tested upgrade path X to Y, and it keeps track of all versions of resources currently installed. In the event all resources on version Y are flagged as OUTDATED, it will internally schedule the Y to Z upgrade path. As the upgrade process needs to be rolling for all upgrade paths, the internal hop over version Y is not visible to the customer in terms of availability of the cloud. The customer does not need to either wait or address the upgrade from version X to Y, then an upgrade from version Y to Z, through all the paths defined for each version, and triggers a single version upgrade. By this technology, any outdated version may be easily upgraded to any other target version, within defined boundaries (e.g., imposed by marketing or sales), without supporting (e.g., developing and testing) the particular upgrade matrix for each version.

Figure 3A:
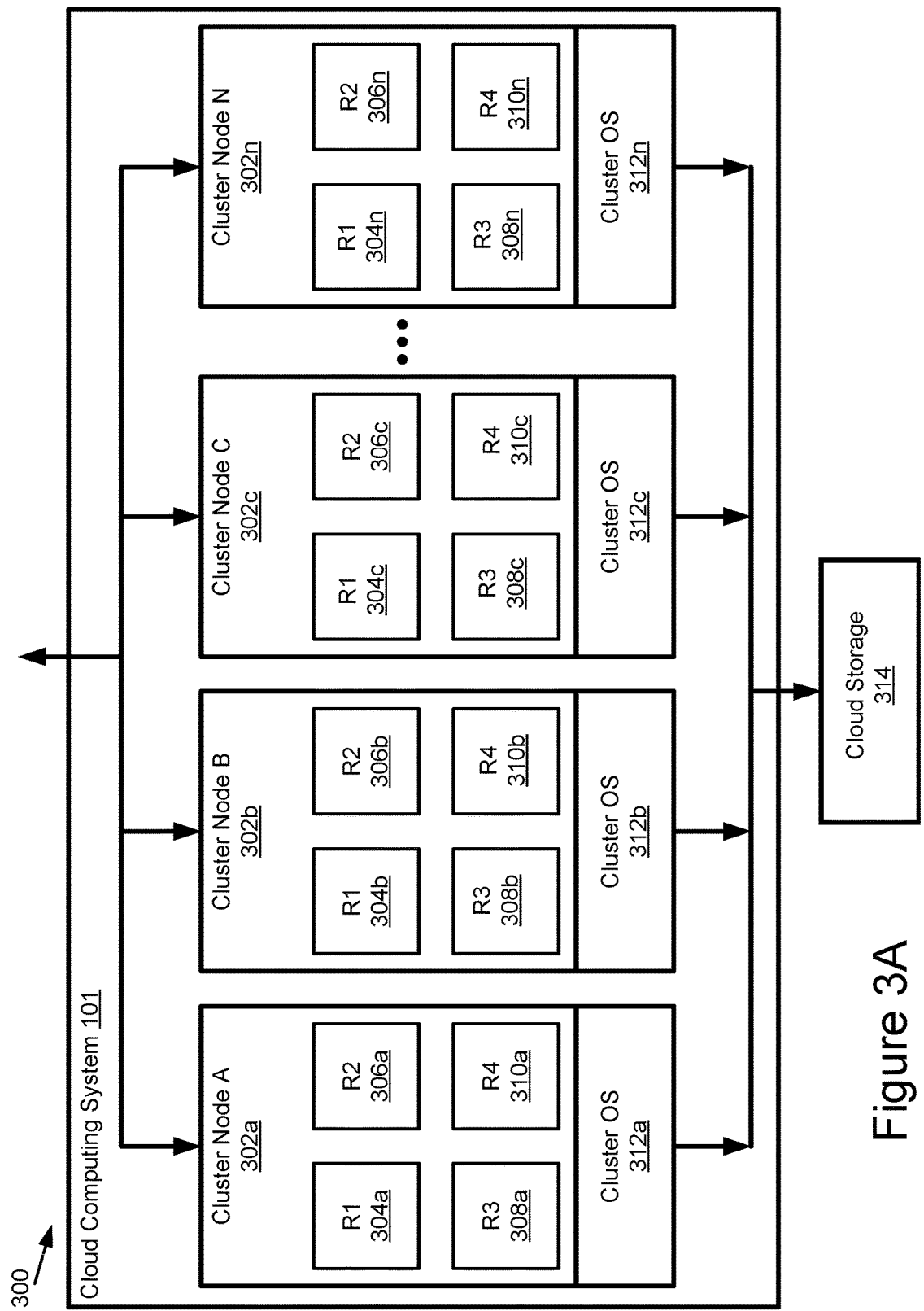
FIGS. 3A, 3B, and 3C are block diagrams showing example cluster nodes with multiple resources.

Referring now to FIG. 3A, it should be recognized that because updating a large number of processes in a software layer of cloud architecture may be a very time consuming task, any resource, software or application may be updated in groups of processes. A rolling upgrade individually upgrades and restarts each node in the cluster (e.g., cluster nodes A-N in FIG. 1) so that only one node is offline at a time. A rolling upgrade takes longer to complete than a simultaneous upgrade, by which new software is installed and all nodes (e.g., cluster nodes A-N in FIG. 1) are restarted at the same time. In a rolling upgrade, from a starting node (e.g., node A in FIG. 1), nodes may be upgraded and restarted in a sequential order. The upgrade process may be monitored from the starting node. During a rolling upgrade, nodes that are not actively upgraded remain online and can continue serving clients (e.g., at remote devices 102 in FIG. 1). Clients connected to a restarting node are disconnected and reconnected. How the client connection behaves when a node is restarted depends on several factors including client type, client configuration (mount type, timeout settings), IP allocation method, and how the client connected to the cluster.

FIG. 3A illustrates the cloud environment 300 poised for multiple-version upgrades to be performed in a single run. The cloud computing system 101 includes the various cluster nodes A, B, C, through N. Each cluster node (A, B, C, through N) includes multiple resources (R1-R4) and a cluster operating system (OS). Cluster Node A (indicated by reference numeral 302a) has resources R1 (304a), R2 (306a), R3 (308a), and R4 (310a). For purposes of illustration, these resources R1-R4 are arranged in arrays (with rows and columns). The Cluster OS is illustrated and referenced by reference numeral 312a. Similarly, Cluster Node B (302b) includes resources R1 (304b), R2 (306b), R3 (308b), and R4 (310b) and cluster OS 312b. The Cluster Node C (302c) includes resources R1 (304c), R2 (306c), R3 (308c), and R4 (310c) and Cluster OS 312c. The Cluster Node N (302n) includes resources R1 (304n), R2 (306n), R3 (308n), and R4 (310n) and Cluster OS 312n. The cluster nodes A-N are coupled to cloud storage 314.

Each of these groups of resources R1-R4 may be referred to as a resource update domain. While one resource update domain is updated, other update domains may remain functioning. The update schemes may use input from the particular resource software or application to determine how the processes may be grouped and in what sequence the resource groups or resource update domains may be updated. In some instances, input from the software application may determine an optimum resource update scheme. In some instances, the resource update scheme may change based on the particular circumstance and the type of update being performed. In some implementations, the resource update schemes may involve updating either the resource configuration or the resource executable code. The same resource update scheme may be used to update various infrastructure components, such as updating host hardware, host software including the host operating system, virtual machine configuration, guest operating system, and other software components operable on the host or virtual machine. The resource update schemes may be used to update executable code or to reconfigure a hardware or software component without changing the executable code.

Figure 3B:
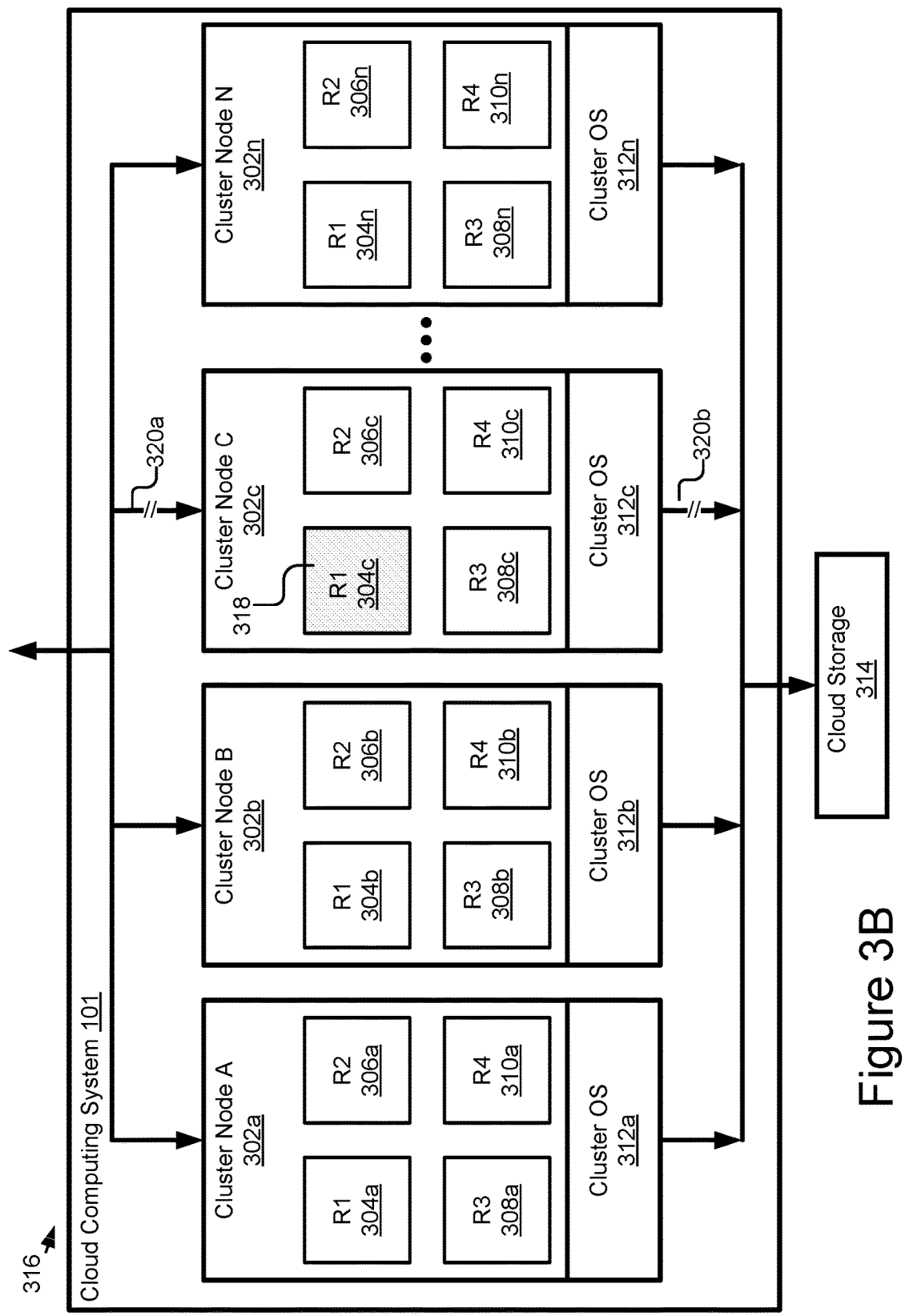

Referring now to FIG. 3B, in a rolling upgrade process, the cloud environment 316 includes the various groups of resources R1-R4 at the various cluster nodes A-N. An example rolling upgrade process may involve multiple operations, including 1) identifying how long each node in the cluster has been running by executing a command, 2) determining the detailed information on protection operations running on the cluster, 3) checking the health of each drive on the node, 4) checking data management interface logs for a record of errors reported by individual memory modules on the cluster, 5) checking for free node space, 6) running compatibility checks, 7) collecting cluster status, 8) restarting the cluster, and 9) restarting each node by running the reboot command. These operations are just some examples. Many more operations may be used. In some implementations of a rolling upgrade process, drive firmware may be updated, and client connections may be disconnected. Other operations may be included and any of these may be omitted. Before a rolling upgrade process begins, outstanding critical events, errors, and failures may be resolved, since unresolved events and errors may disrupt the upgrade process. A rolling upgrade may be performed through a web interface or, alternatively, through a command line interface.

In the illustrated embodiment, for purposes of explanation, resource R1 (304c) in cluster node C is illustrated by shading to designate that this particular resource is identified as outdated. The resource R1 is determined to not have the target version of software required for compatibility with the other resources in this cluster node C. This determination is communicated by a message relayed along line 320a, and any information or data collected relating to this determination is relayed to the cloud storage 314, over line 320b.

In FIG. 3B, in one example scenario, Resource R1 304c at cluster node C may require an upgrade to the $n^{th}$ (target) version of Resource R1 and a backup upgrade 318 of prior version(s) of that resource (e.g., prior version Resource R1 304c-1 (the $1^{st}$ version) and intermediary versions between 304c-1 and 304c-n, which is the target and $n^{th}$ version). In some implementations, the target version of a resource (e.g., Resource 304c-n) and the collection of prior version(s) (e.g., backup 318) are stored in the same cloud storage 314, so that the versioning of a resource (e.g., backup 318) is backed up when the cloud storage 314 that includes the resource (e.g., Resource R1 304c-n) is backed up. It should be recognized that while a single resource type is illustrated in FIG. 3B, many different resources and many types of resources (e.g., machines, clusters, documents, etc.) may be present and are within the scope of this disclosure.

Figure 3C:
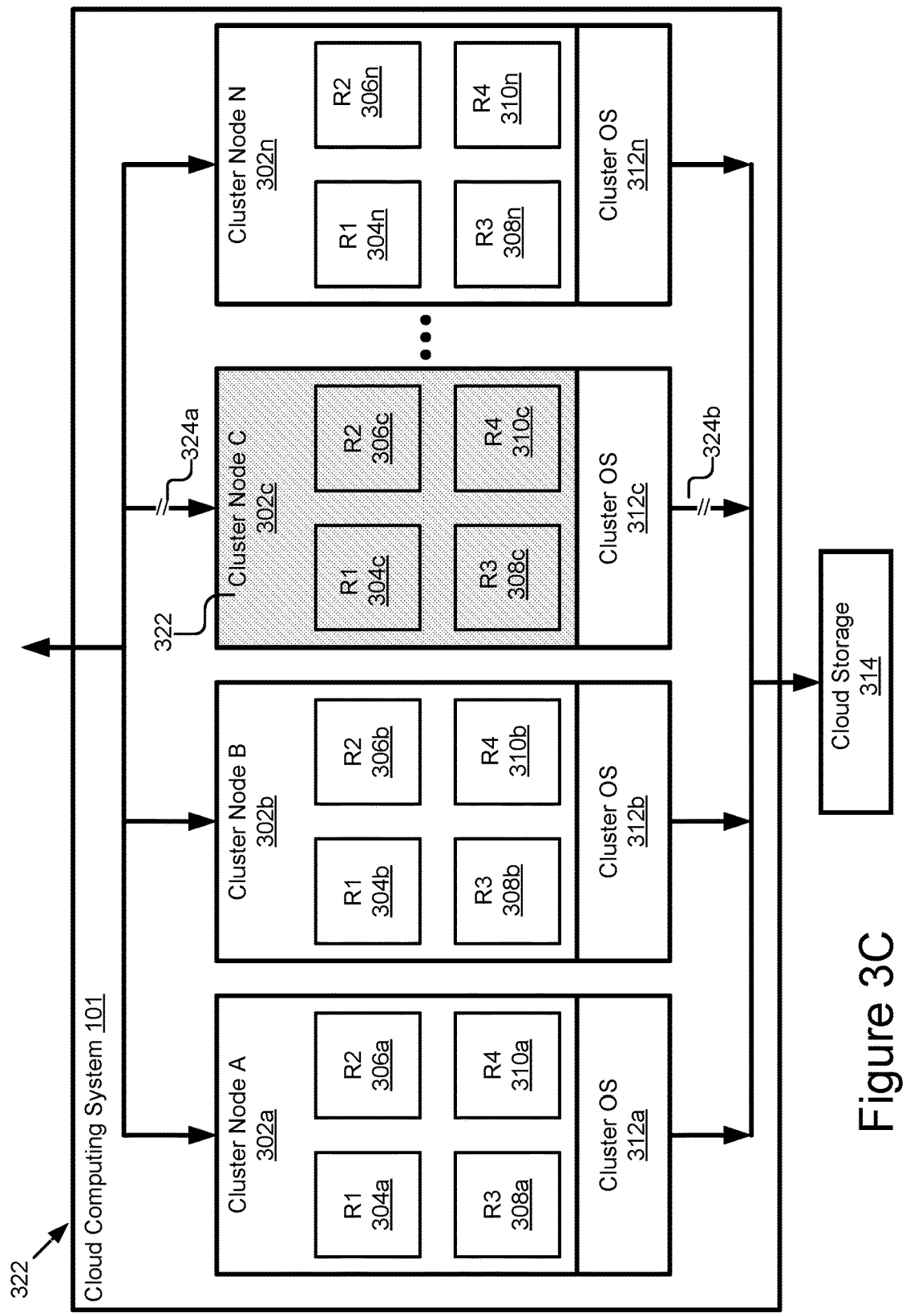

Referring now to FIG. 3C, the cloud environment 322 illustrates a scenario in which the entire cluster node C is shown with shading to designate that the resources R1-R4 (304c-310c) at that node are in an outdated state and require upgrading to a target version. This determination is communicated by a message relayed along line 324a (FIG. 3C), and any information or data collected relating to this determination is relayed to the cloud storage 314, over line 324b (FIG. 3C).

Figure 4:
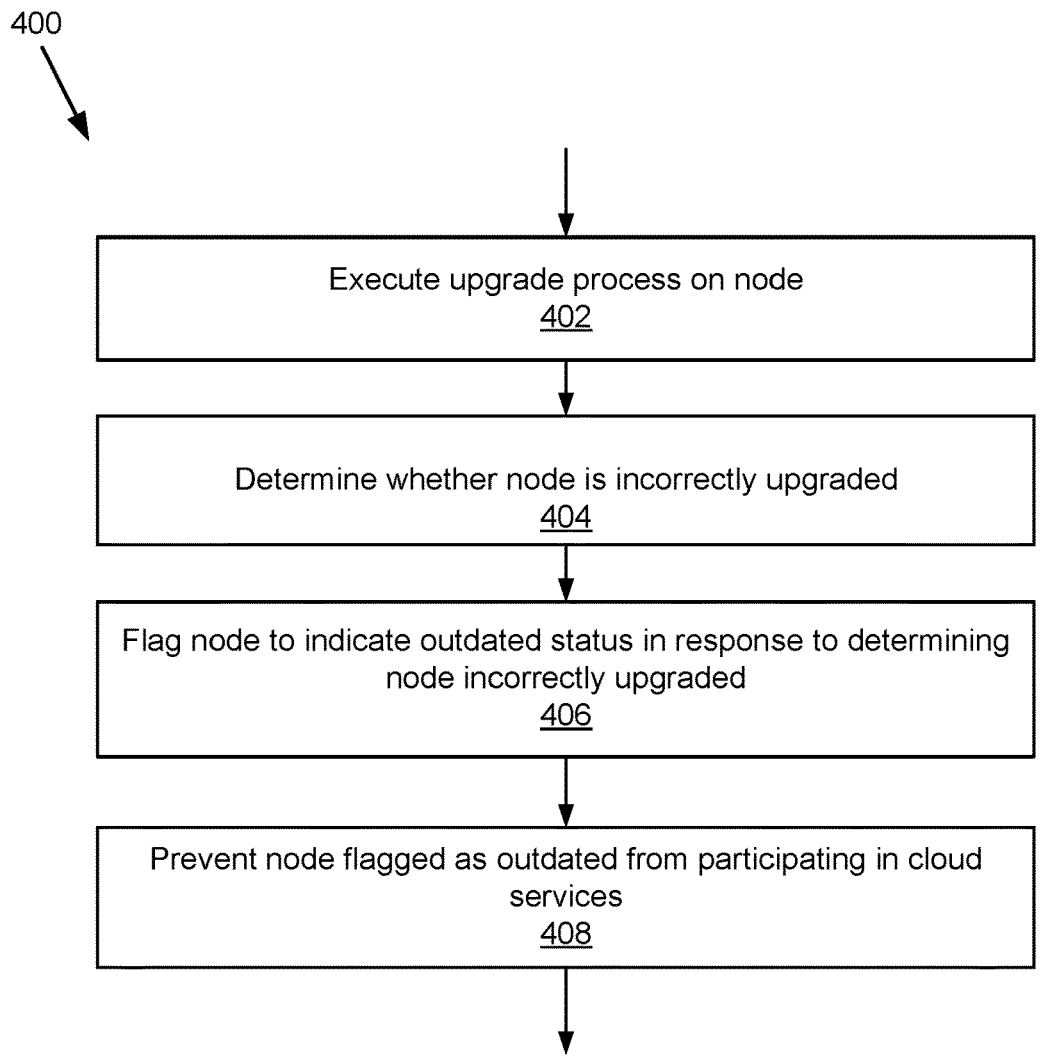
FIG. 4 is a flow chart of an example upgrade method for handling outdated resources in cloud architecture.

FIG. 4 is a flow chart of an example method 400 for handling of outdated resources during an upgrade of cloud software to ensure that outdated resources do not communicate with the rest of the cloud infrastructure (for example, other distributed data models, structures, and APIs) before they are all upgraded to the target software versions or levels. At 402, the outdated-resource-handling module 208 (FIG. 2) starts a rolling upgrade and executes an upgrade on a particular node (e.g., cluster node C in FIG. 3C). At 404, the outdated-resource-handling module 208 determines whether the node (e.g., cluster node C in FIG. 3C) is incorrectly upgraded. At 406, the outdated-resource-handling module 208 flags the outdated node (in this instance, cluster node C) to an "outdated state" in response to determining that the node was incorrectly upgraded. At 408, the outdated-resource-handling module 208 takes steps to prevent the node that is flagged as outdated (here, cluster node C) from participating in the cloud services.

Figure 5:
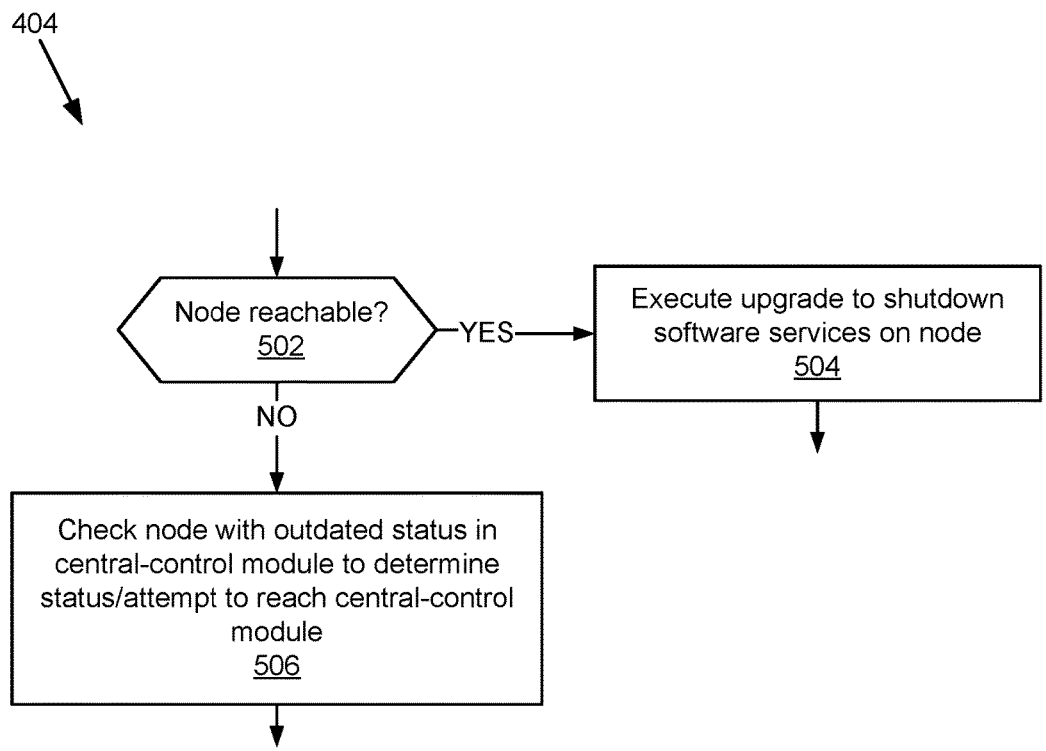
FIG. 5 is a flow chart of an example upgrade method for handling outdated resources in cloud architecture, in instances when a node is accessible to a central control module of the upgrade system.

FIG. 5 is a flow chart of an example process 404 (in FIG. 4) for handling outdated resources (e.g., cluster node C) during an upgrade of cloud software in accordance with one embodiment, when a node is reachable by the outdated-resource-handling module 208. At 502, the outdated-resource-handling module 208 determines if the node (e.g., cluster node C) is reachable (e.g., from a remote location to perform an upgrade, by central-control module 219). If the node (in this instance, cluster node C) is determined to be reachable, at 504, the outdated-resource-handling module 208 executes upgrade operations to shut down the software services on that node, to prevent outdated software from communicating with the other parts of the cloud (e.g., cluster nodes A and B in FIG. 3C) that may already be updated. If the node is not determined to be reachable, at 506, the outdated-resource-handling module 208 in some implementations sends a request to check with the central-control module 219 to determine the status of this node. The central-control module 219 may maintain lists of currently-installed software versions at each cluster node, which may be either solicited or self-reported at periodic instances. In some implementations, period checks may be timed and controlled by the timer module 228 together with the node-self-prevention module 230 (in FIG. 2C). In some implementations, the outdated-resource-handling module 208 may attempt to reach the cluster node C, under control of the central-control module 219 and fail.

Figure 6:
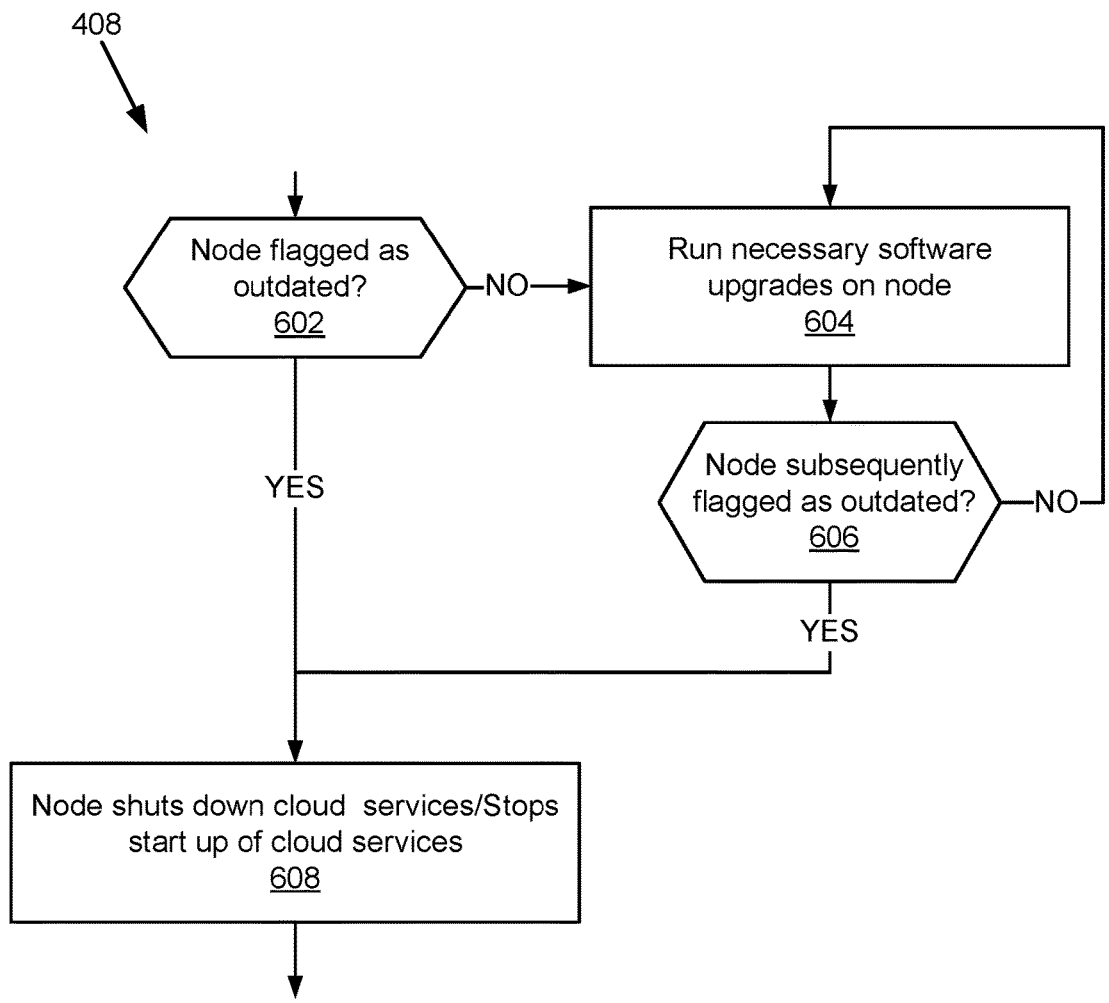
FIG. 6 is a flow chart of an example method for handling outdated resources in cloud architecture, in instances when a node is not accessible to a central control module of the upgrade system.

FIG. 6 is a flow chart continuing the example process 408 (in FIG. 4) for handling outdated resources in cloud architecture when a node is unreachable by the outdated-resource-handling module 208. At 602, the outdated-resource-handling module 208 determines if the node is flagged as outdated in the central-control module 219. At 604, if the node is not flagged as outdated, then the outdated-resource-handling module 208 runs the necessary software upgrades on the cloud services at the node. The outdated-resource-handling module 208, at 606, may make periodic determinations to see if a particular node is subsequently flagged as outdated. In some implementations, a check may be performed every N seconds. If the answer is negative at 606, the process returns to 604, where the outdated-resource-handling module 208 will run the necessary software upgrades on the cloud services on the node. The rolling upgrade process may wait for N+X seconds (where X is a buffer period) before running the upgrade. After waiting the designated amount of time (e.g., X), the rolling upgrade process makes an assumption that the node has shut down its outdated services and continues to upgrade the other resources. At 608, if the outdated-resource-handling module 208 determines that the node is flagged as outdated (at either 602 or 606), then the node itself shuts down the cloud services. In the instances where the outdated-resource-handling module 208 at the node cannot reach the central-control module 219 (in the distributed architecture) (for example, when there is a network split), the node itself stops the startup of the cloud services.

Figure 7:
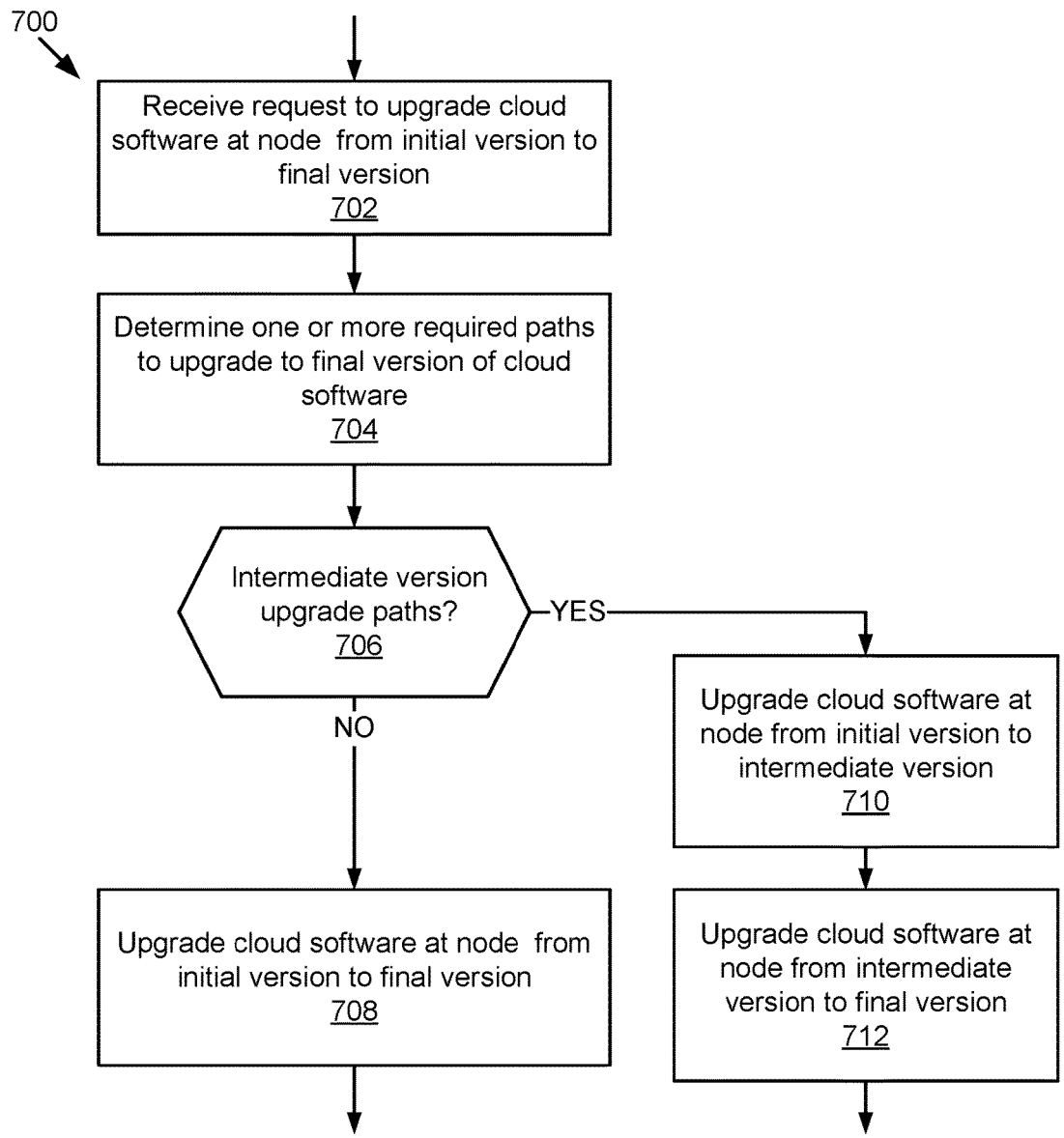
FIG. 7 is a flow chart of an example multiple-version upgrade method executed in a single upgrade operation, by which the multiple internal paths of interim upgrade versions are not visible to the end user.

FIG. 7 is a flow chart of an example process 700 for a multiple-version upgrade, involving multiple operations, yet performed in a single upgrade for the end user. The end user (at remote device 102 in FIG. 1) does not see the multiple interim internal paths. Only a single upgrade operation is visible to the end user. At 702, the multiple-version upgrade module 210 receives a request to upgrade node service (e.g., in a rolling upgrade process), from an initial or currently-installed version to a final version. At 704, the upgrade-version-tracking module 231 determines the currently-installed version of the operating software (e.g., version X)

and determines the upgrade path (version X to version Y to version Z) required to update the operating software to the target version (e.g., version Z). The upgrade path may require an upgrade to an intermediate version (e.g., version Y) before an upgrade to the final target version (e.g. version Z). In some instances, the versioning module 232 uses the upgrade metadata to split up an upgrade path that is determined into either of well-known, well-defined, or well-tested upgrade paths (e.g., further smaller paths within Y; Y1-YN). These paths may already have assessed upgrade impact to ensure that the upgrading does not disrupt the cluster, workflow, or users. At 706, the multiple-version upgrade module 210 determines whether an intermediate version upgrade path is required. If the answer is negative (i.e., an intermediate version upgrade path is not required), at 708, the multiple-version upgrade module 210 performs upgrades on the node (e.g., cluster node C in FIG. 3C) from the initial version identified (e.g., version Y) to the final version required (e.g., version Z). If the answer at 706 is affirmative (i.e., an intermediate version upgrade path is required), at 710, the multiple-version upgrade module 210 causes the interim-upgrade-processing module 238 to execute upgrades to cloud software at a node from the initial version to the intermediate version. The process 700 proceeds to the next block 712, at which stage, the interim-upgrade-processing module 238 executes operations to upgrade the cloud software at the node from the intermediate version to the final version. For example, if a customer starts an upgrade from version X to Z, the software internally follows an upgrade through version Y. The upgrade process will follow the well-tested path from version X through version Y, by keeping track of all versions of resources that are currently installed. If all the resource are on version Y or flagged as OUTDATED, the process will internally schedule the Y through Z upgrade path. By this process, the upgrade schemes of the disclosed technologies safeguard the heterogeneous software versions on the cloud.

The systems and methods described above provide a highly reliable system for implementing cross device redundancy schemes. In the above description, for purposes of explanation, numerous specific details were set forth. It will be apparent, however, that the disclosed technologies can be practiced without any given subset of these specific details. In other instances, structures and devices are shown in block diagram form. For example, the disclosed technologies are described in some implementations above with reference to user interfaces and particular hardware. Moreover, the technologies disclosed above primarily in the context of on line services; however, the disclosed technologies apply to other data sources and other data types (e.g., collections of other resources for example images, audio, web pages).

Reference in the specification to "one implementation" or "an implementation" means that a particular feature, structure, or characteristic described in connection with the implementation is included in at least one implementation of the disclosed technologies. The appearances of the phrase "in one implementation" in various places in the specification are not necessarily all referring to the same implementation.

Some portions of the detailed descriptions above were presented in terms of processes and symbolic representations of operations on data bits within a computer memory. A process can generally be considered a self-consistent sequence of steps leading to a result. The steps may involve physical manipulations of physical quantities. These quantities take the form of electrical or magnetic signals capable of being stored, transferred, combined, compared, and otherwise manipulated. These signals may be referred to as being in the form of bits, values, elements, symbols, characters, terms, numbers, or the like.

These and similar terms can be associated with the appropriate physical quantities and can be considered labels applied to these quantities. Unless specifically stated otherwise as apparent from the prior discussion, it is appreciated that throughout the description, discussions utilizing terms for example "processing" or "computing" or "calculating" or "determining" or "displaying" or the like, may refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The disclosed technologies may also relate to an apparatus for performing the operations herein. This apparatus may be specially constructed for the required purposes, or it may include a general-purpose computer selectively activated or reconfigured by a computer program stored in the computer. Such a computer program may be stored in a computer readable storage medium, for example, but is not limited to, any type of disk including floppy disks, optical disks, CD-ROMs, and magnetic disks, read-only memories (ROMs), random access memories (RAMs), Erasable Programmable Read-Only Memories (EPROMs), Electrically Erasable Programmable Read-Only Memories (EEPROMs), magnetic or optical cards, flash memories including Universal Serial Bus (USB) keys with non-volatile memory or any type of media suitable for storing electronic instructions, each coupled to a computer system bus.

The disclosed technologies can take the form of an entirely hardware implementation, an entirely software implementation or an implementation containing both hardware and software elements. In some implementations, the technology is implemented in software, which includes but is not limited to firmware, resident software, microcode, state machines, gate arrays, etc.

Furthermore, the disclosed technologies can take the form of a computer program product accessible from a non-transitory computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

A computing system or data processing system suitable for storing and/or executing program code will include at least one processor (e.g., a hardware processor) coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

When the disclosed technologies are embodied in the general context of computer-executable instructions, the embodiments may comprise program modules, executed by one or more systems, computers, or other devices. Generally, program modules include routines, programs, objects, components, data structures, and the like, that perform particular tasks or implement particular abstract data types.

The functionality of the program modules may be combined or distributed as desired in various embodiments.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

Finally, the processes and displays presented herein may not be inherently related to any particular computer or other apparatus. Various general-purpose systems may be used with programs in accordance with the teachings herein to create special purpose apparatus, or it may prove convenient to construct a more specialized apparatus to perform the required method steps. The required structure for a variety of these systems will appear from the description below. In addition, the disclosed technologies were not described with reference to any particular programming language. It will be appreciated that a variety of programming languages may be used to implement the teachings of the technologies as described herein.

The foregoing description of the implementations of the present techniques and technologies has been presented for the purposes of illustration and description. It is not intended to be exhaustive or to limit the present techniques and technologies to the precise form disclosed. Many modifications and variations are possible in light of the above teaching. It is intended that the scope of the present techniques and technologies be limited not by this detailed description. The present techniques and technologies may be implemented in other specific forms without departing from the spirit or essential characteristics thereof. Likewise, the particular naming and division of the modules, routines, features, attributes, methodologies and other aspects are not mandatory or significant, and the mechanisms that implement the present techniques and technologies or its features may have different names, divisions and/or formats. Furthermore, the modules, routines, features, attributes, methodologies and other aspects of the present technology can be implemented as software, hardware, firmware or any combination of the three. Also, wherever a component, an example of which is a module, is implemented as software, the component can be implemented as a standalone program, as part of a larger program, as a plurality of separate programs, as a statically or dynamically linked library, as a kernel loadable module, as a device driver, and/or in every and any other way known now or in the future in computer programming. Additionally, the present techniques and technologies are in no way limited to implementation in any specific programming language, or for any specific operating system or environment. Accordingly, the disclosure of the present techniques and technologies is intended to be illustrative, but not limiting.

What is claimed is:

1. A method comprising:
  receiving, by a controller, a request to execute an upgrade of a resource at a particular cluster node in a cloud, wherein the upgrade is for a conversion of the resource from an initial version to a final version;
  responsive to receiving the request, determining, by the controller, if the resource is in an outdated state; and
  if the resource is determined to be in the outdated state:
    flagging, by the controller, the resource;
    executing an instruction, by the controller, to prevent communication from the resource to other cluster nodes in the cloud;
    determining, by the controller, if a multiple-version upgrade is required to update the resource from the initial version to the final version;
    using upgrade metadata of the resource to split up the multiple-version upgrade into previously defined and tested upgrade paths from the initial version to the final version;
    designating the previously defined and tested upgrade paths within a conversion matrix;
    determining one or more intermediate paths for the conversion using the conversion matrix;
    selecting, using the conversion matrix, an intermediate path from the one or more intermediate paths for the multiple-version upgrade;
    executing the multiple-version upgrade, by the controller, by first converting the initial version of the resource to one or more interim versions, via the selected intermediate path, and subsequently converting from the one or more interim versions to the final version; and
    concealing, from an end user, conversions through the one or more interim versions to the final version.

2. The method of claim 1, wherein the controller is coupled to a central location for access to data provided by the particular cluster node to indicate states of multiple resources at the particular cluster node, wherein the particular cluster node provides data indicating the states of multiple resources to the central location.

3. The method of claim 2, wherein the multiple-version upgrade is executed responsive to determining an outdated state for a particular resource from the central location.

4. The method of claim 3, wherein the outdated state for the particular resource is determined from the central location at predetermined times.

5. The method of claim 1, wherein a number of the one or more interim versions and associated paths are tracked and placed in a queue for conversion.

6. The method of claim 1, wherein the controller accesses the particular cluster node to determine if a particular resource at the particular cluster node is outdated.

7. The method of claim 1, wherein in the event the controller cannot reach the particular cluster node, the particular cluster node has a mechanism to shut down services operated at the particular cluster node.

8. The method of claim 1, wherein the outdated state of a resource indicates if a particular resource in the particular cluster node is at least one of 1) improperly upgraded and 2) not upgraded.

9. A system comprising:
  a processor; and
  memory storing instructions that, when executed by the processor, cause the processor to:
    receive a request to execute an upgrade of resources at a particular cluster node in a cloud, wherein the upgrade is for conversion of the resources from an initial version to a final version;
    responsive to receiving the request, determine if any one of the resources is in an outdated state;
    flag a particular resource that is determined to be in the outdated state;
    execute instructions to prevent communications from the resource determined to be in the outdated state to other cluster nodes in the cloud;

determine if a multiple-version upgrade is required to update the resource determined to be in the outdated state from the initial version to the final version;

use upgrade metadata of the resource to split up the multiple-version upgrade into previously defined and tested upgrade paths from the initial version to the final version;

determine one or more paths for upgrading to the final version using a conversion matrix;

select an intermediate upgrade path from the one or more paths for upgrading to the final versions for the multiple-version upgrade; and execute the multiple-version upgrade using the intermediate upgrade path for conversion from the initial version to the final version via at least one interim version, wherein the intermediate upgrade path is distinct from a displayed upgrade path visible to an end user.

10. The system of claim 9, wherein the processor is coupled to a central location for access to data provided by the particular cluster node to indicate states of multiple resources at the particular cluster node, wherein the particular cluster node provides data indicating the states of multiple resources to the central location.

11. The system of claim 10, wherein the multiple-version upgrade is executed responsive to determining an outdated state for a particular resource from the central location.

12. The system of claim 11, wherein the outdated state for the particular resource is determined from the central location at predetermined times.

13. The system of claim 9, wherein a number of the at least one interim version and associated paths are tracked and placed in a queue for conversion.

14. The system of claim 9, wherein the processor accesses the particular cluster node to determine if a particular resource at the particular cluster node is outdated.

15. The system of claim 9, wherein in the event the processor cannot reach the particular cluster node, the particular cluster node has a mechanism to shut down services operated at the particular cluster node.

16. The system of claim 9, wherein the outdated state of a resource indicates if a particular resource in the particular cluster node is at least one of 1) improperly upgraded and 2) not upgraded.

17. A computer program product comprising a non-transitory computer useable medium including a computer readable program, wherein the computer readable program when executed on a computer causes the computer to:

receive a request to execute an upgrade of resources at a particular cluster node in a cloud, wherein the upgrade is for conversion of the resources from an initial version to a final version;

responsive to receiving the request, determine if any one of the resources is in an outdated state;

flag a particular resource that is determined to be in the outdated state;

execute instructions to prevent communications from the particular resource determined to be in the outdated state to other cluster nodes in the cloud;

determine if a multiple-version upgrade is required to update the particular resource determined to be in the outdated state from the initial version to the final version;

use upgrade metadata of the particular resource determined to be in the outdated state to split up the multiple-version upgrade into previously defined and tested upgrade paths from the initial version to the final version;

designate the previously defined and tested upgrade paths within a conversion matrix;

determine one or more paths for upgrading to the final version, including identifying one or more intermediate upgrade paths for the conversion using the conversion matrix;

select an intermediate upgrade path from the one or more intermediate upgrade paths for the multiple-version upgrade; and execute the multiple-version upgrade using the intermediate upgrade path for conversion from the initial version to the final version via at least one interim version, wherein the intermediate upgrade path is distinct from a displayed upgrade path visible to an end user.

18. The computer program product of claim 17, wherein the computer readable program, when executed on a computer further causes the computer to:

access data provided by the particular cluster node to indicate states of multiple resources at the particular cluster node, wherein the particular cluster node provides data indicating states of the multiple resources to a central location.

19. The computer program product of claim 18, wherein the computer readable program, when executed on a computer further causes the computer to:

execute the multiple-version upgrade, responsive to determining an outdated state for a particular resource from the central location.

20. The computer program product of claim 18, wherein the computer readable program, when executed on a computer further causes the computer to:

determine if a particular state is in an outdated state at predetermined times.

21. The computer program product of claim 17, wherein the computer readable program, when executed on a computer further causes the computer to:

track a number of the at least one interim version and associated paths and place them in queue for conversion.

22. The computer program product of claim 18, wherein the computer readable program, when executed on a computer further causes the computer to:

access the particular cluster node to determine if a particular resource at the particular cluster node is outdated.

23. The computer program product of claim 18, wherein the computer readable program, when executed on a computer further causes the computer to:

shut down services operating at the particular cluster node by a mechanism at the particular cluster node, in the event the computer cannot reach the particular cluster node.

24. A system comprising:

means for receiving a request to execute an upgrade of a resource at a particular cluster node in a cloud, the upgrade for conversion of the resource from an initial version to a final version;

means for determining, responsive to receiving the request, if the resource is in an outdated state;

responsive to determining that the resource is in the outdated state:

means for flagging the resource;

means for executing an instruction to prevent communication from the resource to other cluster nodes in the cloud;
means for determining if a multiple-version upgrade is required to update the resource from the initial version to the final version;
means for designating previously defined and tested upgrade paths within a conversion matrix;
means for using upgrade metadata of the resource to split up the multiple-version upgrade into the previously defined and tested upgrade paths from the initial version to the final version;
means for determining one or more intermediate paths for the conversion using a conversion matrix based on previously defined and tested upgrade paths from the initial version to the final version;
means for selecting an intermediate path from the one or more intermediate paths for the multiple-version upgrade;
means for executing the multiple-version upgrade by first converting the initial version of the resource to one or more interim versions, via the intermediate path, and subsequently converting from the one or more interim versions to the final version; and
means for concealing, from an end user, conversions through the one or more interim versions to the final version.

\* \* \* \* \*